United States Patent [19]

Schaefer et al.

[11] 4,315,126
[45] Feb. 9, 1982

[54] METHOD OF AIR CUTTING AND GOUGING AND A COMBINED TORCH AND NOZZLE ASSEMBLY

[75] Inventors: Peter R. Schaefer; Donald W. Carkhuff, both of Florence, S.C.

[73] Assignee: Union Carbide Corporation, New York, N.Y.

[21] Appl. No.: 154,517

[22] Filed: May 29, 1980

[51] Int. Cl.³ .............................................. B23K 9/00
[52] U.S. Cl. .................................. 219/70; 219/69 M; 219/140; 219/144
[58] Field of Search ................ 219/69 R, 69 M, 70, 219/140, 144

[56] References Cited

U.S. PATENT DOCUMENTS

| 1,240,900 | 9/1971 | Symong | 219/140 |
| 2,538,245 | 1/1951 | Hiller | 219/144 X |
| 2,726,309 | 12/1955 | Stepath | 219/70 |
| 3,035,155 | 5/1962 | Hawk | 219/70 X |
| 3,659,072 | 4/1972 | Carkhuff | 219/70 |

FOREIGN PATENT DOCUMENTS

| 42-22876 | 8/1967 | Japan | 219/70 |
| 680833 | 8/1979 | U.S.S.R. | 219/140 |

Primary Examiner—Elliot A. Goldberg
Attorney, Agent, or Firm—Eugene Lieberstein

[57] ABSTRACT

An arc cutting and gouging torch in combination with nozzle assemblies for suspending a carbon electrode and discharging a combined air stream relative to the carbon electrode centerline. The nozzle assemblies include exit orifices which are disposed in a non-parallel alignment relative to one another and the electrode to cause the air jet discharged from each exit orifice to merge at a location upstream of the arc and substantially about the centerline of the electrode.

9 Claims, 4 Drawing Figures

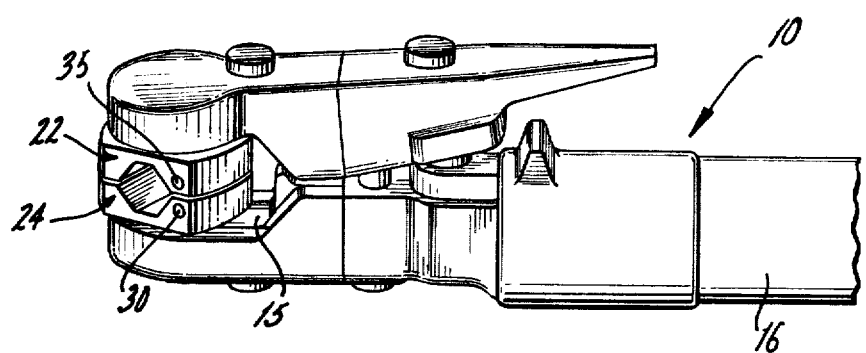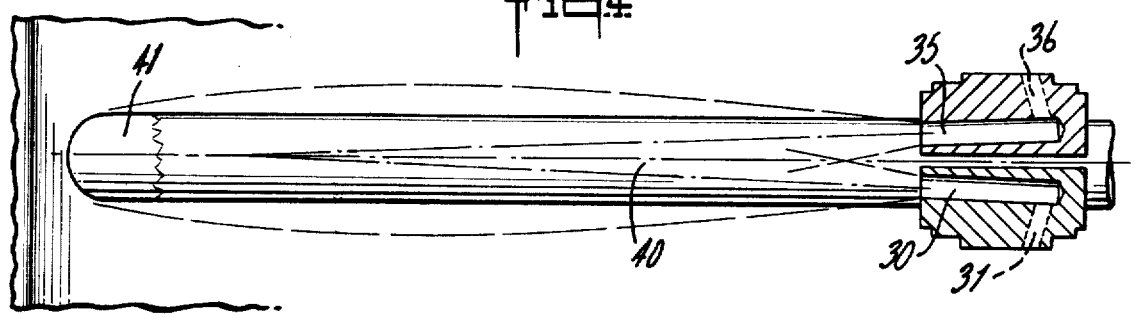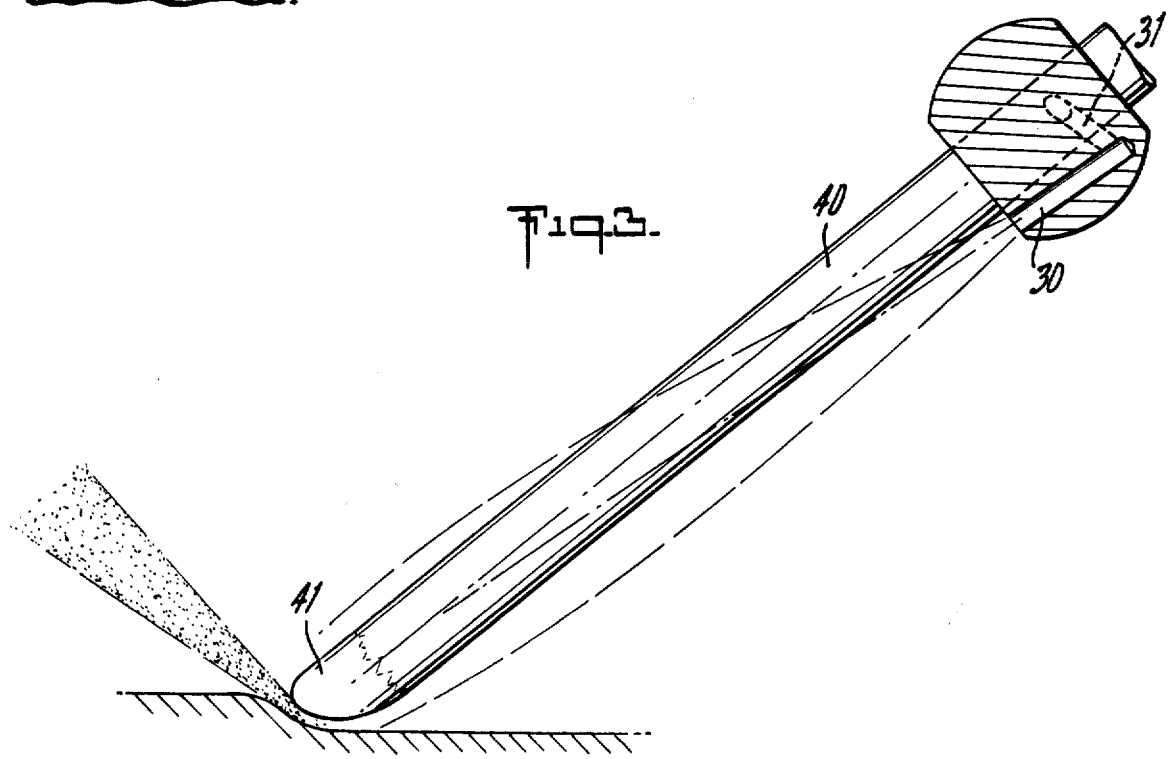

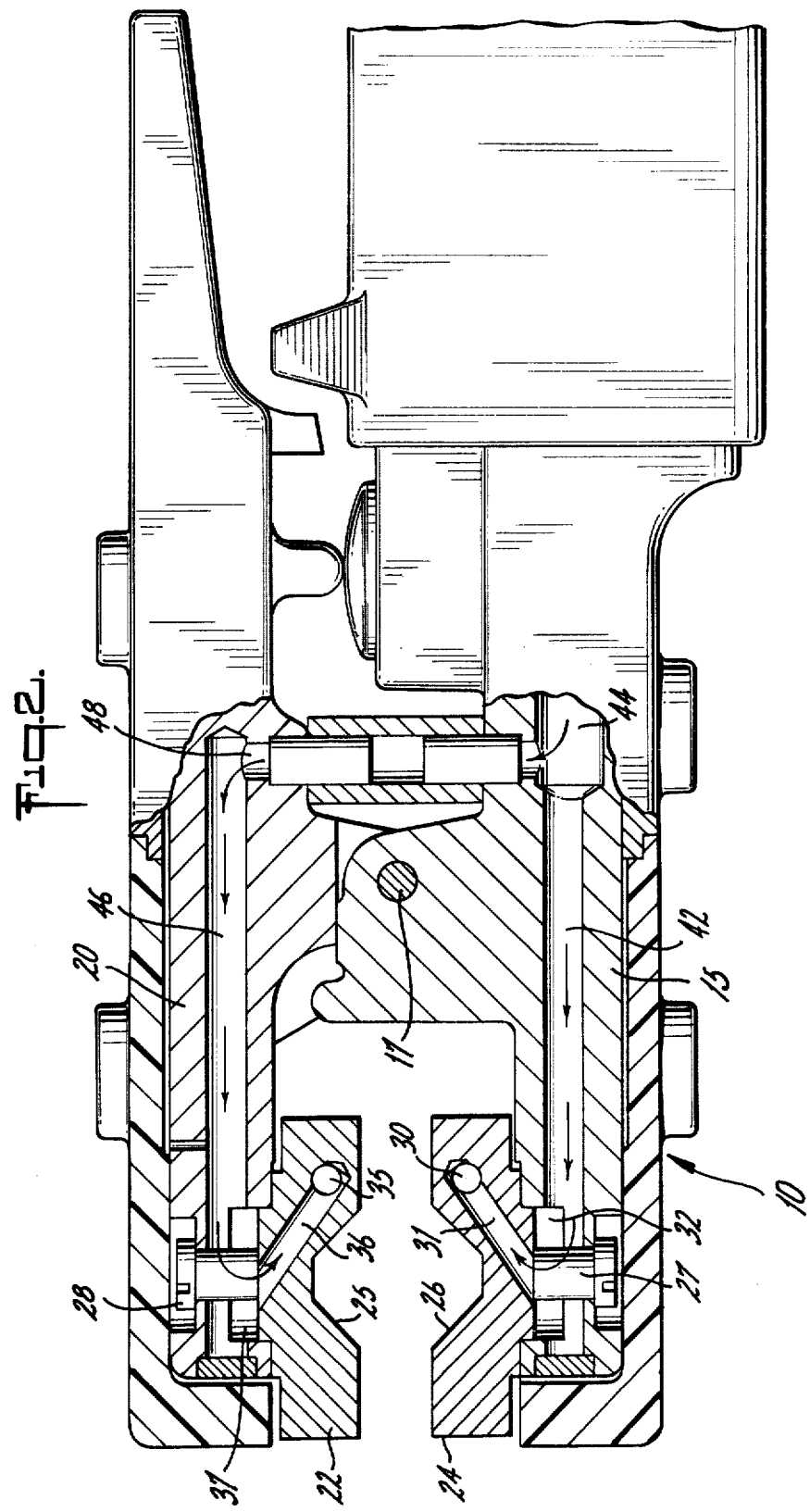

METHOD OF AIR CUTTING AND GOUGING AND A COMBINED TORCH AND NOZZLE ASSEMBLY

This invention relates to an improved method for air carbon arc cutting and gouging and to an arc cutting and gouging torch in combination with a nozzle assembly for practicing such method.

The process of carbon arc cutting and gouging involves striking an arc between the carbon electrode and a metal workpiece to form a pool of molten metal which is forcibly removed from the workpiece by a stream of high velocity air. The carbon electrode is suspended from an automatic or hand held torch which includes a nozzle or nozzle assembly having a plurality of exit orifices arranged beneath the electrode through which the stream of high velocity air is directed. The high pressure air forcibly blows the molten metal away from the cut or gouged surface and in a direction preferably ahead of the arc. The electrode may be advanced along a straight line or moved back and forth for increased metal removal. The latter is known in the art as "pad washing".

In practicing the conventional process the high pressure air is fed through the exit orifices to form a high velocity air blanket beneath the electrode and in a direction substantially parallel to the axis of the electrode. The exit orifices are formed in the nozzle assembly by drilling holes in a parallel relationship to one another and in substantial parallel alignment with the longitudinal axis of the nozzle assembly. The electrode is clamped with its centerline substantially in coaxial alignment with the longitudinal axis of the nozzle assembly. The parallel disposition of the exit orifices relative to one another was heretofore considered an essential requirement for producing a uniform gouging action as the electrode was being consumed.

It has now been discovered that a non-parallel alignment of the exit orifices, with each angled toward one another, and the combination towards the electrode centerline causes the air jet discharged from each exit orifice to merge along the electrode surface at a location upstream of the arc, producing an unexpected and superior gouging operation. In particular, with non-parallel exit orifices the size of the molten metal particles being blown away are reduced to substantially pellet size. This has been found to provide the operator with greater control over spatter. In fact, the molten metal may be controllably rolled over in a single wave without producing fins. Other equally important advantages of non-parallel alignment in accordance with the present invention include the following: The electrode to work angle may be increased substantially beyond the conventional 35 degree limit particularly for pad washing at higher current densities without increasing the level of energy consumption; and the electrode stick out may be increased up to 14 inches as compared to a recommended maximum prior art electrode stick out of about 7 inches.

Accordingly, it is the principal object of the present invention to provide an improved method for cutting and gouging metal using a consumable carbon electrode in combination with a high pressure air jet effluent for controllably removing molten slag formed upon the workpiece during such cutting or gouging operation.

It is another object of the present invention to provide an arc cutting and gouging torch including in combination a nozzle assembly for practicing the method of the present invention.

Other objects, advantages and features of the present invention will become apparent from the following detailed specification when read in conjunction with the accompanying drawings in which:

FIG. 1 is a perspective view of the torch and nozzle assembly of the present invention;

FIG. 2 is a side elevation of the torch in FIG. 1 shown partially in cross-section;

FIG. 3 is a sectional illustration of the nozzle assembly and electrode showing the angular disposition of the exit orifices relative to the electrode center line and to the arc; and FIG. 4 is a similar view to FIG. 3 with the nozzle assembly and electrode rotated 90° to show the angular relationship of the exit orifices with respect to one another and to the electrode centerline.

Referring now to the drawings, and in particular, to FIGS. 1 and 2 in which a cutting and gouging torch 10 is shown in combination with an upper and lower nozzle assembly 22 and 24 respectively for detachably gripping a carbon graphite electrode. The torch 10 has a main conductive body 15 with its rearward end surrounded by an insulating sleeve 16 adapted to be manually held by an operator. The torch sleeve 16 surrounds a cable and hose assembly (not shown) for supplying electrical power and air to the torch main body 15 from an external power source and air supply respectively.

The torch 10 has an upper arm 20 which is pivotally connected to the main body 15 through a pivot pin 17. The upper arm 20 is urged against the main body 15 by a spring (not shown) which clamps the upper nozzle assembly 22 against the lower nozzle assembly 24 for securing an electrode seated therebetween. The opposing seating surfaces 25 and 26 of the upper and lower nozzle assemblies 22 and 24 have a cross-sectional complementary configuration to accommodate various different size electrodes. A generally trough-shaped configuration is preferred for the seating surfaces 25 and 26 although other complementary shapes may be used.

The lower nozzle assembly 24 is fastened to the torch body 15 by a removable screw 27. Similarly the upper nozzle assembly 22 is fastened to the upper arm 20 by a removable screw 28. By loosening the screw members 27 and 28 the nozzle assemblies 22 and 24 may be adjusted to rotatably align the electrode supported therebetween into any desired position relative to the longitudinal axis of the torch 10.

The lower nozzle assembly 24 has a drilled elongated exit orifice 30 intersecting a passageway 31 which is inclined with respect to the longitudinal axis of the torch for communicating with a plenum chamber 32 in the main body 15 regardless of the rotated position of the lower nozzle assembly 24. Likewise, the upper nozzle assembly 22 has a drilled elongated exit orifice 35 intersecting a passageway 36 which is inclined relative to the longitudinal axis of the torch for communicating with a plenum chamber 37 in the upper arm 20 regardless of the rotated position of the upper nozzle assembly 22. Although only two exit orifices 30 and 35 are shown, it is obvious that any number of exit orifices may be used. In fact, the method of the present invention may be practiced with only one nozzle assembly and may conceivably require only one exit orifice which would be centered in the lower nozzle assembly 24 and appropriately angled toward the electrode centerline. A channel or passageway would be required to couple such orifice to the plenum chamber 32. However, multiple exit orifices are preferred. When multiple exit orifices are used, they should be symmetrically arranged about the electrode but may be located in only one of the nozzle assemblies such as the lower nozzle assembly 24. The arrangement shown in the drawings is the preferred embodiment particularly for pad washing. The non-parallel disposition of the exit orifices 30 and 35 relative to one another and to the longitudinal axis of the nozzle assemblies is essential to the present invention and will be discussed hereafter in greater detail in connection with FIGS. 3 and 4 respectively.

The torch main body 15 has a longitudinal passage 42 communicating with the plenum chamber 32 and extending from the delivery line 44 through which compressed air is fed at a predetermined high pressure from a source (not shown). The upper arm 20 also has a longitudinal passage 46 which couples the plenum chamber 37 to the delivery line 44 through an interconnecting passageway 48.

the exit orifices 30 and 35 should lie at an angle relative to one another and to the centerline of the electrode 40, as is shown in FIGS. 3 and 4, to cause the air discharged from each orifice to merge into a single column of air at a location substantially upstream of the arc. The non-parallel requirement for the exit orifices is preferably fulfilled by inclining each of the exit orifices, regardless of number, toward the centerline of the electrode and preferably with their axes intersecting the electrode centerline upstream of the arc. The specific disposition of the exit orifices will depend upon the number of orifices, the workpiece material, electrode size, current, air pressure, electrode to work angle, travel speed and the ratio of the length of each exit orifice to its diameter. A 1-3 degree included angle between the orifice centerline and the electrode centerline has been found acceptable but is not to be construed as limiting. On the other hand, an exit orifice length to diameter ratio of at least five to one has been found to be a preferred requirement for practicing the present invention regardless of other operating parameters and conditions.

What is claimed is:

1. In a method of cutting or gouging metal from a workpiece using an arc established between a carbon electrode and said workpiece in which the electrode is suspended from a torch having nozzle means for gripping the electrode and simultaneously directing a stream of high velocity gas toward said arc for blowing away molten metal from the workpiece while the torch is advanced along the workpiece in a predetermined path; the improvement comprising:

forming said high velocity gas stream by directing high velocity gas through at least two elongated exit orifices aligned relative to one another in a non-parallel relationship with each exit orifice directed toward said electrode such that the high velocity effluent from each orifice merges to form said stream of high velocity gas at a location substantially upstream of said arc and substantially about the centerline of said electrode.

2. In a method as claimed in claim 1 wherein each exit orifice is symmetrically arranged about said electrode such that said stream of high velocity gas is substantially formed beneath the plane of said electrode to propel the molten metal ahead of said arc in the direction of torch travel.

3. In a method as claimed in claim 2 wherein said nozzle means comprises an upper nozzle assembly having an elongated exit orifice and a lower nozzle assembly having an elongated exit orifice whereas each exit orifice in the upper and lower nozzle assembly is in non-parallel alignment with respect to one another and to the electrode centerline.

4. In a method as claimed in claim 3 further comprising wherein the ratio of the length of each exit orifice to the diameter of the exit orifice is at least 5 to 1.

5. In combination, an arc cutting and gouging torch having a main conductive body with a first internal passage through which high pressure gas is adapted to be fed, a clamping arm pivotally connected to said main conductive body and having a second internal passage through which said high pressure gas is also adapted to be fed, and nozzle means disposed between said clamping arm and said main conductive body for suspending an elongated carbon electrode in a radially adjustable position relative to the longitudinal axis of the torch; said nozzle means comprising:

an upper nozzle assembly connected to said clamping arm, including a first elongated exit orifice for discharging said high pressure gas from said torch and a first passageway connected to said first exit orifice and communicating with said first internal passage;

a lower nozzle assembly connected to said main body, including a second elongated exit orifice for simultaneously discharging said high pressure gas from said torch and a second passageway connected to said second exit orifice and communicating with said second internal passage; and wherein said first exit orifice and said second exit orifice are disposed in a non-parallel relationship relative to one another each forming an included angle with the centerline of the electrode to cause said high pressure gas exiting from each orifice to merge at a location substantially upstream of the arc end of the electrode.

6. Apparatus as claimed in claim 5 wherein said first and second passageway are inclined at an acute angle relative to the longitudinal axis of the torch for coupling said first and second exit orifice to said first and second internal passage respectively.

7. Apparatus as claimed in claim 6 wherein said upper and lower nozzle assembly each have a seating surface opposing one another with a complimentary surface configuration for accommodating said carbon electrode.

8. Apparatus as claimed in claim 6 wherein said seating surface is trough-shaped in geometry.

9. Apparatus as claimed in claim 8 wherein said first and second elongated exit orifice has a predetermined length to diameter ratio of at least five to one.

* * * * *